United States Patent [19]

Hougen

[11] 4,131,384
[45] Dec. 26, 1978

[54] ARBOR FOR ANNULAR HOLE CUTTER

[76] Inventor: Everett D. Hougen, G-5072 Corunna Rd., Flint, Mich. 48504

[21] Appl. No.: 831,363

[22] Filed: Sep. 8, 1977

[51] Int. Cl.² .................. B23B 47/00; B23B 51/00
[52] U.S. Cl. .................. 408/68; 408/207; 408/703
[58] Field of Search .................. 408/67, 68, 207, 208, 408/209, 703

[56] References Cited

U.S. PATENT DOCUMENTS

| 25,289 | 8/1859 | Taylor et al. | 408/68 |
| 1,478,623 | 12/1923 | Valiton | 408/207 |
| 1,478,624 | 12/1923 | Valiton | 408/68 |
| 3,825,362 | 7/1974 | Hougen | 408/68 |

FOREIGN PATENT DOCUMENTS 1061227 11/1953 France .................. 408/68

Primary Examiner—Harrison L. Hinson
Attorney, Agent, or Firm—Barnes, Kisselle, Raisch & Choate

[57] ABSTRACT

An arbor for an annular hole cutter which includes a center pilot pin spring biased axially outwardly beyond the leading end of the cutter and which is retained in the cutter frictionally so as to be readily manually removable therefrom after the cutter has initiated a cut in the material in which the hole is being formed.

12 Claims, 6 Drawing Figures

U.S. Patent  Dec. 26, 1978  4,131,384
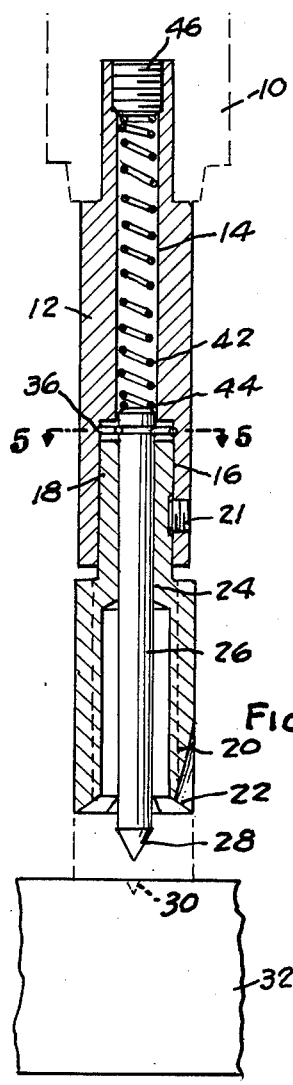
FIG. 1
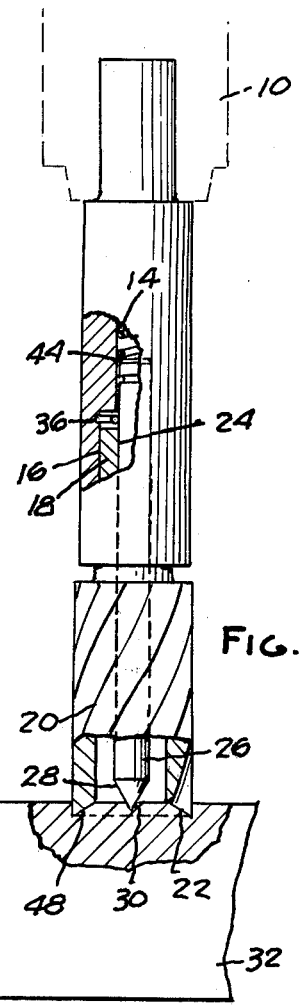
FIG. 2
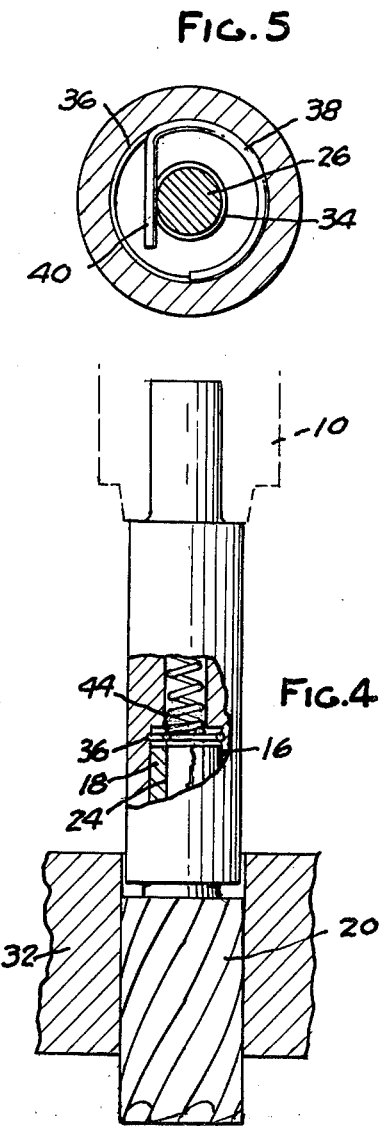
FIG. 5
FIG. 4
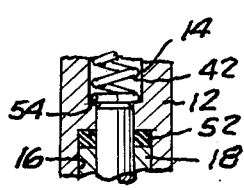
FIG. 6
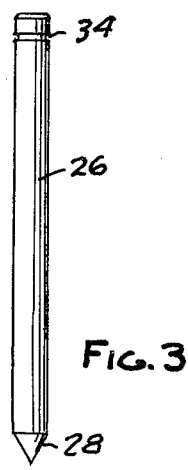
FIG. 3

ARBOR FOR ANNULAR HOLE CUTTER

This invention relates to an arbor for an annular hole cutter of the type which includes a center pilot pin.

It is common practice to incorporate in an arbor for an annular hole cutter a retractable, spring-biased center pilot pin adapted to engage the workpiece to maintain the cutter in an accurately concentric position relative to the hole being formed by the cutter. The pilot pin is spring-biased so that its leading end normally projects at least slightly beyond the leading end of the annular cutter to engage a prick punch depression located on the workpiece at the center of the hole to be formed. As the cutter advances into the workpiece, the spring which backs up the pilot pin compresses and permits the pilot pin to retract relative to the cutter and arbor. If the depth of the hole is relatively short, a conventional arbor of the type described presents no special problem. However, when cutting relatively deep holes the use of an arbor with a spring-biased pilot pin arranged in conventional manner presents serious disadvantages. For example, with the conventional pilot pin arrangement the pilot pin has to be capable of retracting axially into the cutter and arbor a distance at least slightly greater than the depth of the hole to be formed in the workpiece. Consequently, this requires a spring having an expanded length substantially longer than the depth of the hole to be formed. This in turn requires an unduly long arbor to accommodate the relatively long spring. In addition, it is obvious that the force exerted by the spring on the pilot pin increases progressively as the spring is compressed. Consequently, in forming a deep hole with a cutter having a pilot pin arranged thereon in the conventional manner the amount of force required to feed the cutter through the workpiece becomes excessively large as the depth of the hole increases.

The present invention has for its object the provision of an arbor for annular hole cutters which avoids the problems discussed above.

More specifically, the object of this invention is to provide a pilot pin of sufficient length to project at least slightly beyond the leading end of the cutter. The spring in the arbor for biasing the pilot to its projected position is of a length sufficient to enable the pilot to retract a relatively short distance within the cutter, that is, substantially only that distance required to enable the cutter to initiate the cut in the workpiece after the cutter forms a shallow annular groove in the workpiece. The cutter cooperates with the groove so formed to provide its own guiding action and the centering action of the pilot pin is no longer required. In the arbor of this invention the pilot pin is retained in the arbor merely by friction so that it can be simply withdrawn from the leading end of the arbor after the cut is initiated by retracting the cutter from the workpiece a distance sufficient to enable the pilot to be simply manually withdrawn from within the cutter without requiring the use of any tools.

Other objects, features and advantages of the present invention will become apparent from the following description and accompanying drawings, in which:

FIG. 1 is a sectional view showing an arbor and cutter according to the present invention just prior to initiation of the cut in the workpiece;

FIG. 2 is a view similar to FIG. 1 and showing the cutter and arbor advanced into the workpiece to an extent such that the cutter forms a shallow annular groove in the workpiece;

FIG. 3 is an elevational view of the pilot pin;

FIG. 4 is a view similar to FIG. 2 and showing the cutter and arbor after the cutter has penetrated entirely through the workpiece;

FIG. 5 is a sectional view along the line 5—5 in FIG. 1; and

FIG. 6 is a fragmentary sectional view showing a modified form of the invention.

In FIG. 1 there is illustrated a spindle 10 in which an arbor 12 is retained by any suitable means. Arbor 12 has a through bore 14, the lower portion of which is enlarged as at 16 to receive the shank 18 of an annular cutter 20. Cutter 20 is adapted to be locked on arbor 12 by screw 21. The lower end of cutter 20 is formed with a plurality of cutting teeth 22. The axial end faces of teeth 22 are preferably inclined axially upwardly in a radially inward direction as best shown in FIG. 2.

The shank 18 of the cutter 20 is formed with an axially through bore 24 in which there is slideably arranged a pilot pin 26. Pin 26 is pointed at its leading end as at 28 so that it can be easily engaged within a prick punch depression 30 formed in the workpiece 32 at the center of the hole to be formed therein. Pin 26 has a length which is preferably slightly greater than the length of cutter 20. Adjacent the inner or upper end thereof pin 20 is formed with an annular groove 34. The upper end of the enlarged bore 16 of arbor 12 is likewise formed with a groove 36. A spring wire retaining ring 38 is engaged within groove 36. Ring 38 has a circumferential extent at least slightly greater than 180° so that the resilient action thereof will firmly retain it in groove 36. At one end thereof ring 38 has a chordal spring finger 40 which is adapted to engage in groove 34 on pilot pin 26 when groove 34 registers axially with groove 36. As shown in FIG. 1, groove 34 registers axially with groove 36 when the pointed end 28 of pilot pin 26 projects at least slightly axially beyond the leading end of the teeth 22. Within the reduced diameter portion of bore 14 there is arranged a compression spring 42. The lower end of compression spring 42 bears against the upper end of the pilot pin 26 as at 44 and the upper end of spring 42 bears against a threaded plug 46 within the upper end of the bore 14.

With the arrangement shown in FIG. 1 it will be appreciated that in order to retract pilot pin 26 beyond the position illustrated it is necessary to apply an axial upward force to the pilot pin sufficient to overcome the downward force applied to the pilot pin by spring 42 as well as the retention force exerted by the finger 40 of ring 38 on the pilot pin. These forces can be readily varied by obvious design parameters. However, it should be observed that the frictional force applied to the pilot pin by spring 38 should be sufficient to prevent spring 42 from projecting pilot pin 26 downwardly beyond the position shown in FIG. 1.

In operation the cutter is arranged over the workpiece in which the hole is to be formed with the pointed end 28 of pilot pin 26 aligned with the prick punch depression 30 in the workpiece. Spindle 10 is then advanced (shifted axially downwardly when oriented as shown in the drawing) to engage the pointed end 28 of pilot pin 26 with the prick punch depression 30. Thereafter sufficient downward force is applied to the spindle to cause the finger 40 of ring 38 to be cammed radially outwardly out of engagement with groove 34 on the pilot pin 26. When this occurs, spring finger 40 bears frictionally against the outer surface of pin 26 and the pin is urged downwardly against the workpiece by spring 42. As the cutter advances toward and into the workpiece the teeth 22 thereon form a shallow groove 48 in the workpiece concentric with the center prick punch depression 30. After the groove 48 is formed to a depth as approximately shown in FIG. 2, the groove 48 cooperates with the leading end of cutter 20 so that the cutter becomes self-guiding thereafter. In other words, after the cutter has penetrated into the work to the approximate position shown in FIG. 2, pilot pin 26 is no longer required to provide a centering and guiding action on the cutter. Accordingly, after the cutter has penetrated into the workpiece as shown in FIG. 2, spindle 10 can be retracted upwardly away from the work and the pilot pin 26, which is again projected by spring 42 to the position shown in FIG. 1, can be manually grasped and withdrawn from within the cutter and arbor.

More specifically, the spindle is raised sufficiently to permit pilot pin 26 to be completely withdrawn manually from within the cutter and arbor. When this occurs the chordal spring finger 40 of ring 38 is engaged by the lower end of spring 42 and retains the spring within the arbor. After the pilot pin has been removed from within the cutter, spindle 10 is again driven downwardly to engage the leading end of the cutter with the shallow groove 48 previously formed in the workpiece. The application of downward force on the spindle is continued while the cutter is rotating so that eventually the cutter will penetrate entirely through the workpiece, at which time the centered cylindrical slug 50 will simply drop out of the cutter. With the above described operation it will be noted that after the pilot pin is removed the downward force applied to the cutter is only that required to cause the cutter to penetrate through the workpiece. After the pilot pin 26 is removed from within the cutter arbor spring 42 obviously does not influence the force required to cause the rotating cutter to penetrate through the workpiece.

In the arrangement shown in FIG. 6 the frictional engagement of the pilot pin with the arbor is obtained by means of a rubber or other elastic washer or O-ring 52 rather than a wire spring such as shown at 38. In the arrangement illustrated in FIG. 6 the lower end of bore 14 is formed with a narrow radially inwardly extending annular shoulder 54 on which the lower end of spring 42 is seated. Below shoulder 54 the bore is ensmalled to receive the shank of pilot pin 26 with a close sliding fit. Washer 52 is arranged between the upper end of the shank 18 of cutter 20 and the upper end of the enlarged bore portion 16 of arbor 12. Resilient washer 52 has an inner diameter, at least when compressed as shown, less than the diameter of pilot pin 26 so that washer 52 frictionally engages the outer surface of the pilot pin. With the arrangement shown in FIG. 6, when the pilot pin projects beyond the leading end of the cutter (as shown in FIG. 1), the lower end of spring 42 bottoms on shoulder 54 and pin 26 is retained in place solely by the frictional engagement of washer 52. When the pilot pin is retracted as shown in FIG. 2 the lower end of spring 42 bears against the upper end of pilot pin 26. The function and operation of the arrangement shown in FIG. 6 is substantially the same as described previously in conjunction with FIGS. 1 through 5. In both forms of the invention the pilot pin is retained within the cutter solely by friction, that is, either by spring finger 40 or washer 52. In both cases the degree of friction is of a relatively small amount such that it can be readily overcome by simply grasping the pilot pin and manually withdrawing it. The amount of force applied to the pilot pin when the latter is in the extended position shown in FIG. 1 is slight. This force increases progressively as the cutter approaches the workpiece to retain the pointed end of the pilot engaged with the depression 30 so that the cutter will not "skid" sideways when the cutter teeth engage the surface of the workpiece.

I claim:

1. An arbor for an annular hole cutter comprising a shank having means at its upper end for connection with a rotary driven spindle, the lower end of said arbor being adapted for mounting an annular hole cutter thereon, said shank having an axial bore therein which opens through the lower end of said shank, a pilot pin axially slideable in said bore, said pin being insertable into said bore and being adapted to be withdrawn therefrom through said open end of said bore, a compression spring in said bore acting on the upper end portion of said pin and yieldably biasing the pin downwardly in said bore to a position wherein the leading end of the pin extends axially beyond the leading end of an annular cutter on said arbor, and means independent of said spring fixed axially in said bore and resiliently engaging said pin adjacent its upper end when in said biased position and applying a radial force thereto to frictionally retain the pin in said bore, said resilient means comprising the sole means for retaining the pin in said bore.

2. An arbor as called for in claim 1 wherein said resilient means are arranged to engage the outer surface of the pilot pin.

3. An arbor as called for in claim 1 wherein said resilient means comprises a resilient ring in said bore through which the pilot pin extends.

4. An arbor as called for in claim 3 wherein said ring is formed of rubber.

5. An arbor as called for in claim 3 wherein said ring comprises a rubber washer engaging the outer periphery of said pilot pin.

6. An arbor as called for in claim 3 wherein said ring is formed of metal and has a finger thereon radially engaging said pin.

7. An arbor as called for in claim 6 wherein said pin is formed with a groove on the outer periphery thereof, said spring finger engaging said groove.

8. An arbor as called for in claim 1 wherein said bore comprises at least two axially adjacent sections, the bore section adjacent the lower end of the shank being of a diameter to receive the shank of an annular cutter, the other bore section being of smaller diameter to slideably receive said pilot pin and to accommodate said compression spring.

9. An arbor as called for in claim 8 including a radial shoulder defining the junction between said bore sections, said resilient means being disposed adjacent said shoulder.

10. An arbor as called for in claim 9 including a cutter having a shank disposed in said one bore section with a close fit, means for fixedly retaining the cutter shank in said one bore section, said cutter shank having an axial bore therethrough concentric with the bore in the shank of the arbor and forming a continuation of said other bore section in the shank of the arbor, said pin extending axially through the bore in the cutter shank.

11. An arbor as called for in claim 10 wherein said two bore sections are connected by an annular shoulder, the shank of the cutter terminating short of said shoulder, said resilient means being disposed in the space between said shoulder and the end of the cutter shank.

12. An arbor as called for in claim 11 wherein the portion of the pin extending through the cutter shank has a diameter at least as large as the diameter of the inner end of the pin.

* * * * *